Dec. 16, 1924.
L. E. WEBSTER
COLLAPSIBLE SHOVEL
Filed May 27, 1922
1,519,892
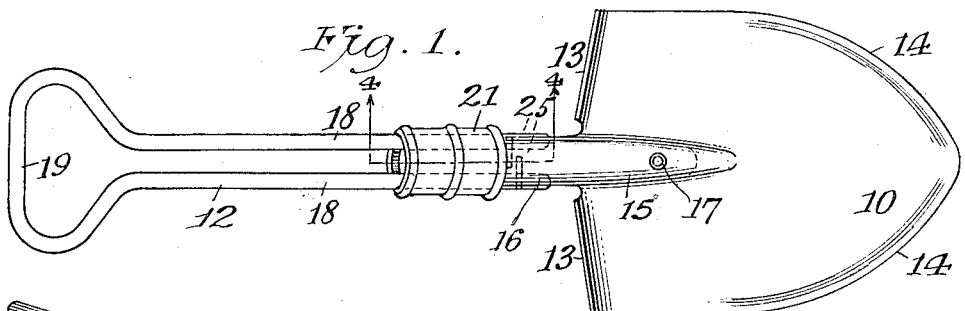
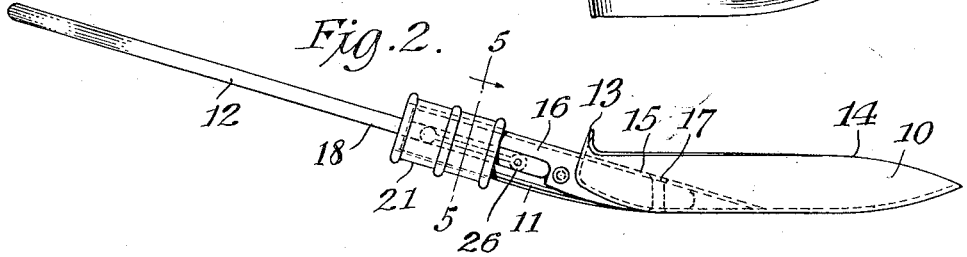
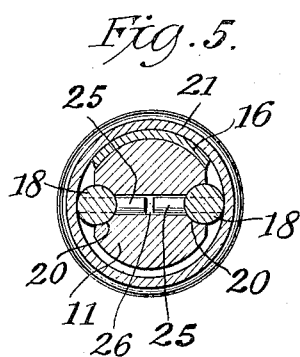
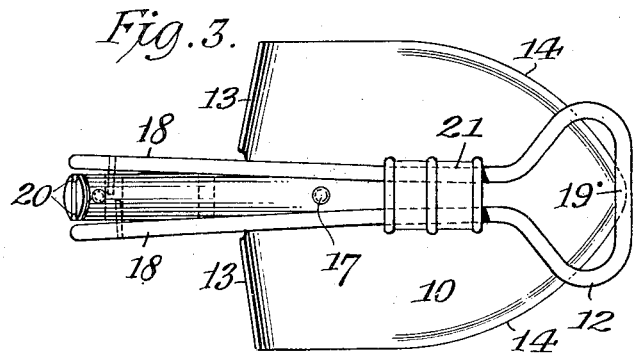
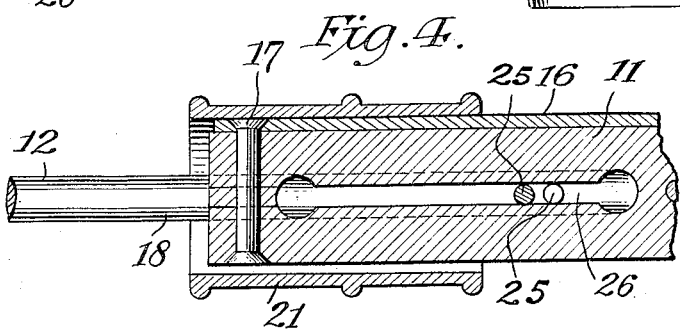
Inventor
L. E. Webster
By his Attorneys
Cooper, Kerr & Dunham.

Patented Dec. 16, 1924.

1,519,892

UNITED STATES PATENT OFFICE.

LEWIS E. WEBSTER, OF WYOMING, PENNSYLVANIA, ASSIGNOR TO THE WYOMING SHOVEL WORKS, OF WYOMING, PENNSYLVANIA, A CORPORATION OF PENNSYLVANIA.

COLLAPSIBLE SHOVEL.

Application filed May 27, 1922. Serial No. 564,156.

*To all whom it may concern:*

Be it known that I, LEWIS E. WEBSTER, a citizen of the United States of America, residing at Wyoming, in the county of Luzerne and State of Pennsylvania, have invented certain new and useful Improvements in Collapsible Shovels, of which the following is a full, clear, and exact description.

This invention relates to shovels and has for one of its principal objects to provide a shovel which may be stored in a small space when not in use.

Another object is to provide a shovel which is particularly adapted to be employed by automobilists, campers, soldiers or others requiring a practical shovel which may be folded or collapsed to a compact form for transportation.

A further object is to provide a shovel of the above mentioned type which may be readily operated from extended to collapsed position and vice versa.

A further object is to provide a collapsible shovel in which the various component parts are always connected so that none of them will be misplaced or lost. Other objects and advantages will appear as the invention is hereinafter described.

Referring to the drawings which illustrate what I now consider a preferred form of the invention:

Fig. 1 is a plan view of the shovel shown in extended position.

Fig. 2 is an elevation of the shovel shown in Fig. 1.

Fig. 3 is a view similar to Fig. 1 but showing the shovel in collapsed or folded position.

Fig. 4 is a detail section taken on the line 4—4 of Fig. 1.

Fig. 5 is a section taken on the line 5—5 of Fig. 2.

The shovel which I have selected for the purpose of illustrating one physical embodiment of the invention comprises a blade 10, a shank 11 and a handle 12. The blade 10 is preferably constructed of pressed steel having flanges 13, 13 at one end and curved edges 14, 14 which are sharpened. The blade is shown provided with an upwardly curved portion 15 and a projecting tongue 16 adapted to conform to the shape of the shank 11. The shank and blade are secured to each other by rivets 17 or other suitable means. While other material may be employed, the shank 11 is preferably a malleable casting.

To secure rigidity of construction I propose to design the shank and handle so that one is provided with a bifurcated portion or with spaced members to receive the other. In the present illustration the handle 12 is in effect bifurcated or provided with spaced end portions, 18, 18 between which the shank 11 is adapted to extend. The specific handle illustrated is one possessing many desirable features and is preferably constructed of cold drawn steel rod bent to the shape shown. It will be noted that the upper end of the handle is in the general form of a loop having a straight portion 19 which may be gripped by the hand of the user and which serves other useful purposes as will hereinafter appear. The shank 11 is shown provided with a pair of slots 20, 20, each adapted to conform to the shape of and to receive a corresponding one of the members 18, 18.

Manually operable means are preferably provided to lock or firmly secure the parts in extended position. To this end the slots 20, 20 are so designed as to cause the outer sides of the members 18, 18 to project beyond the opposite sides of the shank 11 when the parts are assembled as shown in Fig. 1. A sleeve 21 is provided and is movable from a position adjacent the looped end of the handle to the position shown in Fig. 1 in which the sleeve holds the members 18, 18 in the slots 20, 20. A rigid connection between the handle 12 and shank 11 is thus effected. This firmness and rigidity of this connection may be increased by adopting the following preferred design.

The handle 12 is so constructed that its end portions 18, 18 are biased toward each other and the slots 20, 20 are so formed in the shank 11 that they approach each other in the direction toward the handle (Fig. 1). In addition the bore of the sleeve 21 is tapered, being smaller at the handle end than at the shank end (Fig. 1). The degree of taper of the bore of the sleeve and the slots 20, 20 is on the order of one-half of one degree. The design is preferably such that, when the sleeve is manually forced to the position shown in Fig. 1 the members 18, 18 will be wedged inwardly firmly to grip the shank. It will be noted that when the sleeve is moved to firm, locking position, its lower end is spaced an appreciable distance (0.5 inch in one design) from the ends of the members 18. This insures firm connection of the parts even after the members 18, 18 and the interior of the sleeve have become worn. By moving the sleeve 21 up on the handle 12 the parts may readily be moved to the folded or collapsed position shown in Fig. 3.

The shovel thus far described may be employed with satisfactory results and is a completely operative device. In addition, I preferably provide means whereby the parts may be moved from either of the positions shown in Figs. 1 and 3 to the others without disconnecting the parts. To this end the members 18, 18 are each provided with inwardly projecting pivots or pins 25 which project into a slot 26 (Fig. 5) which connects the slots or grooves 20, 20. When it is desired to fold the shovel the sleeve 21 is moved up on the handle 12, the handle is pulled away from the blade 10 until the pins 25 engage the upper end of the slot 26, and the handle and blade are relatively rotated until they assume the position shown in Fig. 3. In this position the shovel is extremely compact and the member 19 serves to shield the tip of the blade.

The operation in moving the parts from collapsed position (Fig. 3) to extended position (Fig. 1) will be understood by those skilled in the art, in view of the foregoing description, as will also the many advantages of the particular shovel disclosed.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered, others omitted and some of the features of each modification embodied in the others without interfering with the more general results outlined and the invention extends to such use.

What I claim is—

1. A shovel comprising in combination, a blade, a shank member secured to said blade, a handle member, one of said members being bifurcated to receive the other, means pivotally connecting said members whereby they may be moved to a collapsed position in which the handle member lies adjacent the blade, and a sleeve for forcing the bifurcated member into firm contact with the other member when the said members are in extended position.

2. A shovel comprising in combination, a blade, a shank secured to said blade, a bifurcated handle into which said shank extends, means pivotally connecting said handle and shank whereby they may be moved to a collapsed position in which the handle lies adjacent the blade, and a slidable sleeve surrounding said handle for forcing its bifurcated end into firm contact with said shank.

3. A shovel comprising in combination, a blade, a shank secured to said blade, a handle having spaced end portions, said shank being provided with grooves to receive said end portions, and a sleeve adapted to be moved into a position surrounding said end portions and shank to cause said end portions to seat firmly in said grooves.

4. A shovel comprising in combination, a blade, a shank secured to said blade, a handle having diverging end portions, said shank being provided with grooves to receive said end portions, said grooves being divergent with relation to each other in the direction toward the blade, and an inwardly tapering sleeve surrounding said end portions for wedging the latter into firm contact with the grooved portions of said shank.

5. A shovel comprising in combination, a blade, a shank secured to said blade, a handle having two spaced end portions, said shank being provided with grooves to receive said end portions and an opening connecting said grooves, a pair of inwardly extending pivots each secured to a corresponding one of said end portions and adapted to extend into said opening, and a sleeve surrounding said handle for causing said end portions to seat firmly in said grooves.

6. A shovel comprising in combination, a blade, a shank secured to said blade, a handle having two spaced end portions, said shank being provided with grooves to receive said end portions and a longitudinally extending slot connecting said grooves, a pair of inwardly extending pivots each secured to a corresponding one of said end portions and adapted to extend into said slot, and a sleeve surrounding said handle for causing said end portions to seat firmly in said grooves.

7. A collapsible shovel comprising in combination, a blade, a shank secured thereto, a handle having a grip and of substantially the same length as the distance between the outer end of said shank and the tip of said blade, and means connecting said shank and handle whereby the latter may be moved into a position in which it lies closely adjacent the blade with the grip projecting slightly beyond the tip of the blade.

8. A shovel comprising in combination, a blade, a shank member secured to said blade, a handle member, one of said members having spaced end portions and the other member having grooves to receive said end portions, a sleeve adapted to be moved into position surrounding said end portions to cause them to seat firmly in said grooves, and means connecting said members whereby they may be relatively moved without disconnecting them from a position in which they are in substantial longitudinal alignment to a collapsed position in which they are substantially parallel.

9. A collapsible shovel comprising in combination, a blade, a shank secured to said blade, a handle having two spaced end portions, said shank being provided with grooves to receive said end portions and a transversely extended opening between said grooves, a pivot pin secured to one of said end portions and adapted to extend into said opening toward the other of said end portions, and a sleeve surrounding said handle for causing said end portions to seat firmly in said grooves.

In testimony whereof I hereto affix my signature.

LEWIS E. WEBSTER.